(12) United States Patent
Wright et al.

(10) Patent No.: US 7,653,789 B2
(45) Date of Patent: Jan. 26, 2010

(54) MULTIPROCESSOR SYSTEM THAT SUPPORTS BOTH COHERENT AND NON-COHERENT MEMORY ACCESSES

(75) Inventors: Gregory M. Wright, Mountain View, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 292 days.

(21) Appl. No.: 11/346,399

(22) Filed: Feb. 1, 2006

(65) Prior Publication Data

US 2007/0180197 A1 Aug. 2, 2007

(51) Int. Cl.
*G06F 12/00* (2006.01)
(52) U.S. Cl. .................. 711/145; 711/141; 711/147
(58) Field of Classification Search ................ 711/141
See application file for complete search history.

(56) References Cited

U.S. PATENT DOCUMENTS

| | | | |
|---|---|---|---|
| 6,615,322 B2 * | 9/2003 | Arimilli et al. | 711/145 |
| 6,658,538 B2 * | 12/2003 | Arimilli et al. | 711/141 |
| 6,697,076 B1 * | 2/2004 | Trivedi et al. | 345/568 |
| 2005/0010728 A1 * | 1/2005 | Piry et al. | 711/147 |
| 2005/0193177 A1 * | 9/2005 | Moga et al. | 711/145 |

OTHER PUBLICATIONS

Domani et al., Thread-Local Heaps for Java, Jun. 21, 2002.*

\* cited by examiner

*Primary Examiner*—Reginald G Bragdon
*Assistant Examiner*—Baboucarr Faal
(74) *Attorney, Agent, or Firm*—Park, Vaughan & Fleming LLP

(57) ABSTRACT

One embodiment of the present invention provides a system that reduces coherence traffic in a multiprocessor system by supporting both coherent memory accesses and non-coherent memory accesses. During operation, the system receives a request to perform a memory access. Next, the system obtains a page table entry (PTE) associated with the memory access. The system then determines if the memory access is coherent or non-coherent by examining an indicator in the PTE. If the memory access is coherent, the system performs the memory access using a coherence protocol. On the other hand, if the memory access is non-coherent, the system performs the memory access without generating coherence traffic.

19 Claims, 4 Drawing Sheets

MULTIPROCESSOR SYSTEM THAT SUPPORTS BOTH COHERENT AND NON-COHERENT MEMORY ACCESSES

BACKGROUND

1. Field of the Invention

The present invention relates to the design of shared-memory multiprocessor systems. More specifically, the present invention relates to a method and an apparatus that reduces coherence traffic in a shared-memory multiprocessor system by supporting both coherent and non-coherent memory accesses.

2. Related Art

In shared-memory multiprocessor systems, cache coherence problems can arise if multiple copies of the same data item exist in local caches attached to different processors. If this is the case, modifying a first copy of the data item in a first local cache will cause the first copy to be different from a second copy of the same data item in a second local cache. Hence, the first and second copies of the data item will not be "coherent."

To prevent the above-described coherence problem, multiprocessor systems often provide a cache-coherence mechanism, which uses a specific cache-coherence protocol, and operates on a system bus that interconnects the coherent caches and a system memory. The cache-coherence protocol ensures that if one copy of a data item is modified in a local cache, other copies of the same data item in other caches (and possibly in the system memory) are updated or invalidated to reflect the modification. The associated messages generated on the system bus by the coherence protocol are typically referred to as "coherence traffic."

As multiprocessor systems begin to include larger number of processors, coherence traffic is becoming progressively heavier and is consuming more system bus bandwidth.

However, some of this coherence traffic is unnecessary. For example, if a data item in a local cache does not have any copies in other caches, there is no need to send an invalidation message to other caches when the data item is modified.

Unfortunately, such invalidation messages are automatically generated by conventional cache-coherence protocols, and hence some of these invalidation messages cause unnecessary coherence traffic, which can degrade overall system performance.

In many cases, cache-coherence is not necessary. For example during new object allocation in a Java Virtual Machine (JVM), a newly allocated object is accessible only to the thread that creates it, and thus may be allocated in a memory space which is not globally accessible, such as a thread-local heap (TLH). The allocation of such a new object may cause a significant number of cache misses, and each cache miss will cause unnecessary invalidation messages to be sent over the system bus.

Hence, what is needed is a method and apparatus for performing memory accesses in a shared-memory multiprocessor system without the above-described performance problems.

SUMMARY

One embodiment of the present invention provides a system that reduces coherence traffic in a multiprocessor system by supporting both coherent memory accesses and non-coherent memory accesses. During operation, the system receives a request to perform a memory access. Next, the system obtains a page table entry (PTE) associated with the memory access. The system then determines if the memory access is coherent or non-coherent by examining an indicator in the PTE. If the memory access is coherent, the system performs the memory access using a coherence protocol. On the other hand, if the memory access is non-coherent, the system performs the memory access without generating coherence traffic.

In a variation on this embodiment, the system receives a command at a processor to configure a page to be non-coherent. In response, the system invalidates all cached copies of cache lines from the page which exist in other caches in the multiprocessor system. The system next sets the indicator in the associated PTE to indicate that the page is non-coherent.

In a further variation on this embodiment, the system invalidates all cached copies of the cache lines from the page by: issuing an explicit instruction that performs an invalidation cross-call from the processor to the other processors in the multiprocessor system; or by transmitting an invalidation message to the other processors, wherein the invalidation message is generated by hardware in the multiprocessor system.

In a variation on this embodiment, the system obtains the PTE by looking up the PTE in a translation lookaside buffer (TLB). If the lookup in the TLB generates a hit, the system obtains the PTE from the TLB. On the other hand, if the lookup in the TLB generates a miss, the system obtains the PTE from a page table in a memory.

In a variation on this embodiment, the indicator from the PTE is carried along with a physical address during subsequent processing of the memory access.

In a variation on this embodiment, if the memory access is directed to a page which is non-coherent, the system first determines if the request to perform the memory access is directed to a local memory or a remote memory. If the request is directed to a local memory, the system performs the memory access without generating coherence traffic. On the other hand, if the request is directed to a remote memory, the system can either disallow the memory access, or can convert the associated page to be coherent and allow the memory access to proceed.

In a variation on this embodiment, the system configures pages in a thread local heap (TLH) to be non-coherent, wherein the TLH is accessible only by a thread which is local to the processor.

In a variation on this embodiment, the system configures pages in a local memory attached to the processor to be non-coherent.

In a variation on this embodiment, the system receives a command to convert a non-coherent page to be a coherent page. In response, the system sets the indicator in the PTE associated with the page to indicate that the page is coherent.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1:
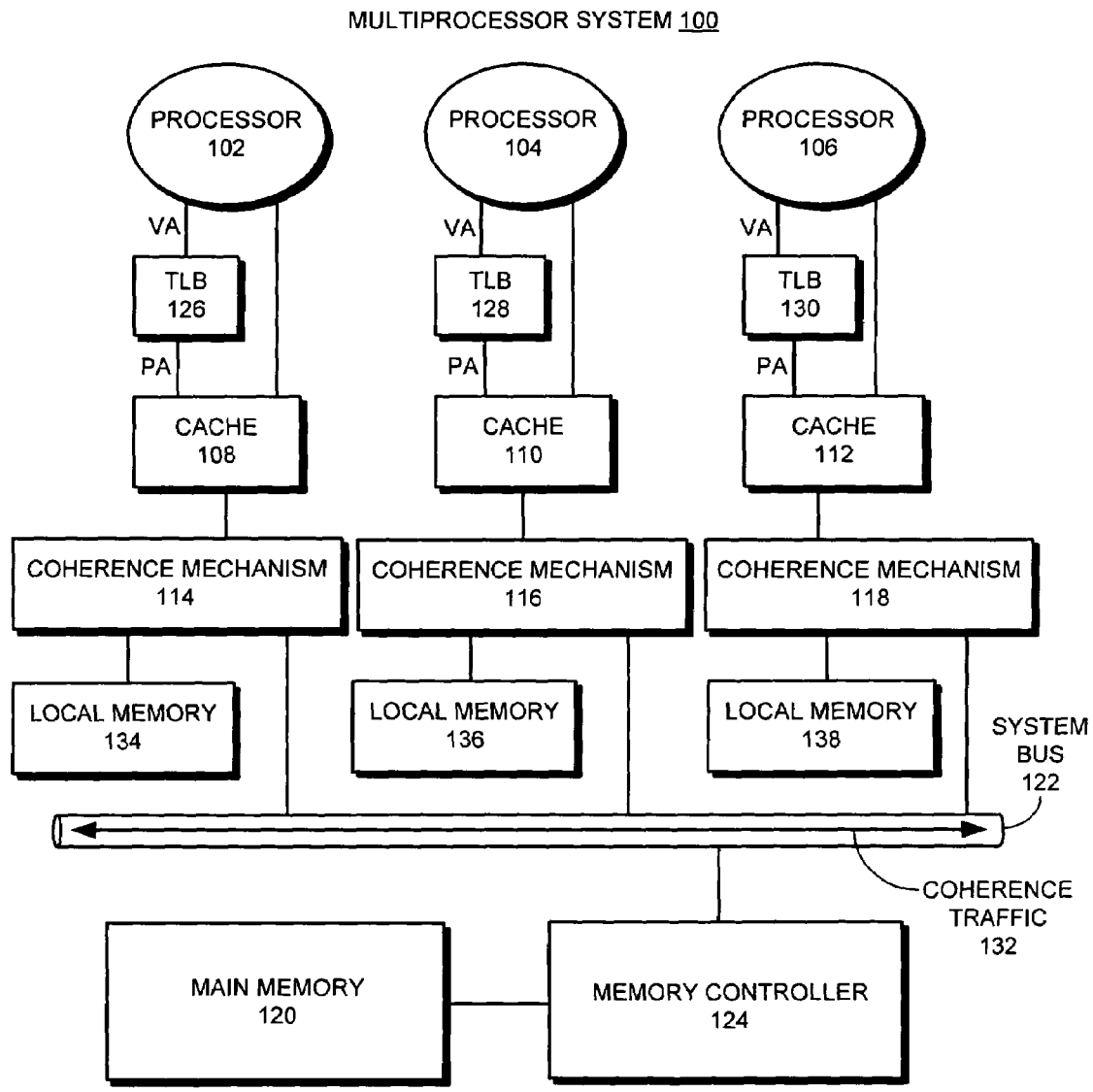
FIG. 1 illustrates a multiprocessor system in accordance with an embodiment of the present invention.

In order to achieve high rates of computational performance, computer system designers typically employ multiple processors that operate in parallel to perform a single computational task. FIG. 1 illustrates such a multiprocessor system 100 in accordance with an embodiment of the present invention. Multiprocessor system 100 can generally include any type of computer system, including, but not limited to, a computer system based on a microprocessor, a mainframe computer, a digital signal processor, a portable computing device, a personal organizer, a device controller, and a computational engine within an appliance.

Multiprocessor system 100 includes three processors 102, 104, and 106, which are coupled to three caches 108, 110, and 112, respectively. Processors 102, 104, and 106 communicate with each other and with a shared main memory 120 through a system bus 122. Note that main memory 120 is coupled to system bus 122 through a memory controller 124. Also note that the interconnect between processors 102, 104, and 106 and main memory 120 is not limited to being a shared bus. During operation, system bus 122 transports data between the various components within multiprocessor system 100. In general, any type of interconnection network can be used in place of system bus 122.

Processors 102, 104, and 106 access code and data from caches 108, 110, and 112, respectively. During operation, if a processor 102 accesses a data item that is not present in cache 108, the system retrieves the data item from main memory 120 (or possibly from another cache or local memory) into cache 108. Note that caches 108-112 can include unified instruction/data caches, or alternatively, separate instruction and data caches. Caches 108-112 can also include multiple levels of caches. For example, cache 108 can include a level-one (L1) cache coupled to a level-two (L2) cache.

Caches 108, 110, and 112 are coupled to system bus 122 through coherence mechanisms 114, 116, and 118 respectively. Each of coherence mechanisms 114-118 manages cache coherence in its associated cache during a memory access operation and additionally generates coherence traffic 132 across system bus 122.

Processors 102, 104, and 106 are associated with local memories 134, 136, and 138, respectively. These local memories 134-138 are directly accessible only by the associated processors. Note that local memories 134-138 are indirectly coupled to system bus 122, as well as caches 108-112 via corresponding coherence mechanisms 114-118. A processor may gain access to a remote processor's local memory via system bus 122 and coherence mechanisms 114-118.

During a memory access operation, system bus 122 transports coherence traffic 132 generated by coherence mechanisms 114-118. In one embodiment of the present invention, coherence traffic 132 generated by coherence mechanism 114 ensures that if one copy of a data item is modified in cache 108, other copies of the same data item in caches 110 and 112, in main memory 120, or in local memories 134-138 are updated or invalidated to reflect the modification.

Processors 102, 104, and 106 are additionally coupled to three corresponding translation lookaside buffers (TLBs) 126, 128, and 130, which translate virtual addresses into physical addresses. More specifically, TLBs 126-130 map addresses of virtual pages to the addresses of physical pages during a memory access operation. More details of the operation of TLBs 126, 128 and 130 are described below in conjunction with the description of FIG. 2.

Although the present invention is described with reference to multiprocessor system 100 with a single level of caches, the present invention can be used with a multi-level caching structure. Furthermore, although multiprocessor system 100 includes three processors, the present invention can generally be used with any system with two or more processors.

Page Table Entry with a Non-Coherent Indicator

Figure 2:
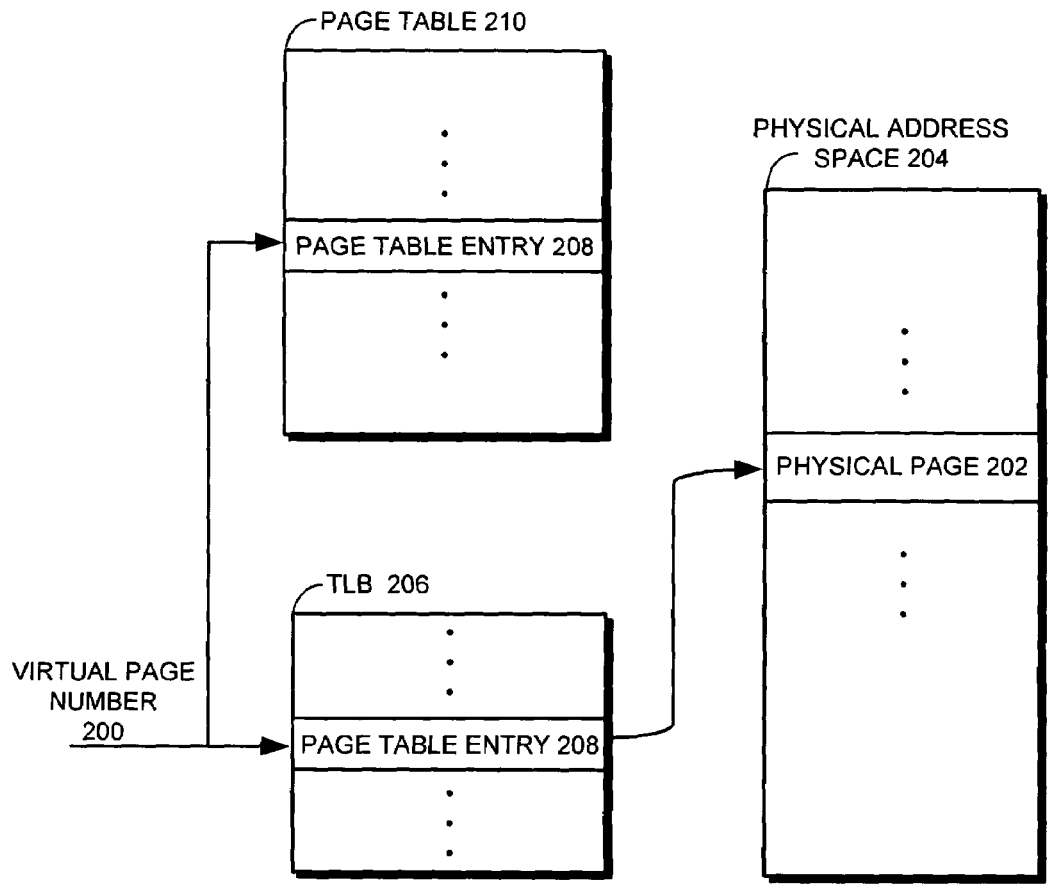
FIG. 2 illustrates the process of mapping between a virtual page and a physical page using a translation lookaside buffer (TLB) in accordance with an embodiment of the present invention.

FIG. 2 illustrates the process of mapping between a virtual page and a physical page using a TLB in accordance with an embodiment of the present invention.

During a memory access, the higher-order bits of the virtual address comprise a virtual page number 200 which is associated with a physical page 202 in physical address space 204. In order to map the virtual page to the physical page, the system initially looks up a page table entry (PTE) 208 associated with virtual page number 200 in TLB 206. If the lookup generates a hit, a corresponding physical page number from PTE 208 is used to access the corresponding physical page 202 in physical address space 204. On the other hand, if the TLB lookup generates a miss, the system looks up PTE 208 in a page table 210 which resides in main memory.

Figure 3A:
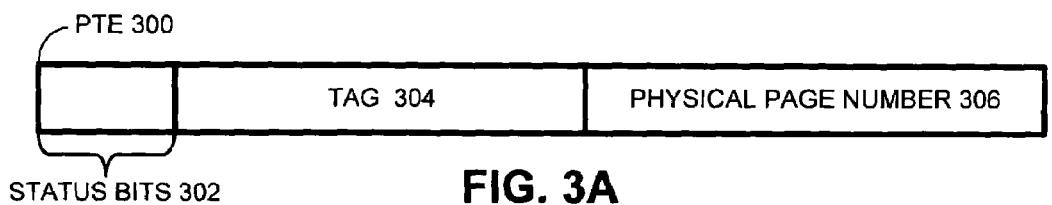
FIG. 3A illustrates a typical page table entry (PTE).

FIG. 3A illustrates a typical PTE. PTE 300 comprises a number of status bits 302, which can include for example, a valid bit, a dirty bit, and other bookkeeping bits; a tag 304 which contains a virtual page number, and a corresponding physical page number 306.

In one embodiment of the present invention, the system supports both coherent memory accesses and non-coherent memory accesses. Specifically, during a coherent memory access, physical pages are accessed using a normal cache-coherence protocol, which generates coherence traffic 132 on system bus 122 (as illustrated in FIG. 1). In contrast, during a non-coherent memory access, physical pages are accessed without performing a cache-coherence operation. Hence, no coherence traffic 132 is generated on system bus 122 during a non-coherent memory access, regardless of whether the memory access is a read operation or a write operation.

Figure 3B:
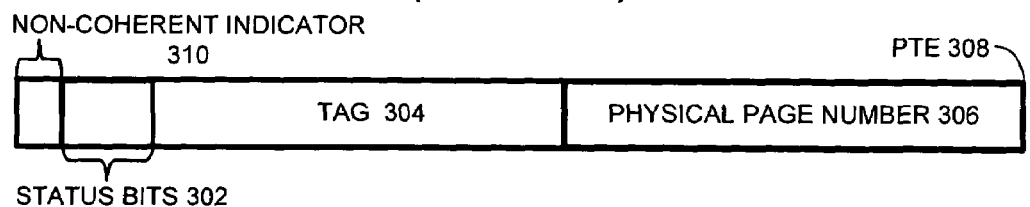
FIG. 3B illustrates a PTE which includes a non-coherent indicator in accordance with an embodiment of the present invention.

One embodiment of the present invention uses an indicator embedded within a PTE to indicate whether a corresponding page is coherent or not. FIG. 3B illustrates PTE 308 which includes a non-coherent indicator 310 in accordance with an embodiment of the present invention. As illustrated in FIG. 3B, PTE 308 is configured to include a "non-coherent indicator" 310, which indicates whether an access to the corresponding page is non-coherent or coherent. In one embodiment of the present invention, non-coherent indicator 310 is a single non-coherent (NC) bit, wherein NC=1 indicates that the corresponding page is non-coherent, and NC=0 indicates that the corresponding page is coherent.

Configuring a Page to be Non-Coherent

Figure 4:
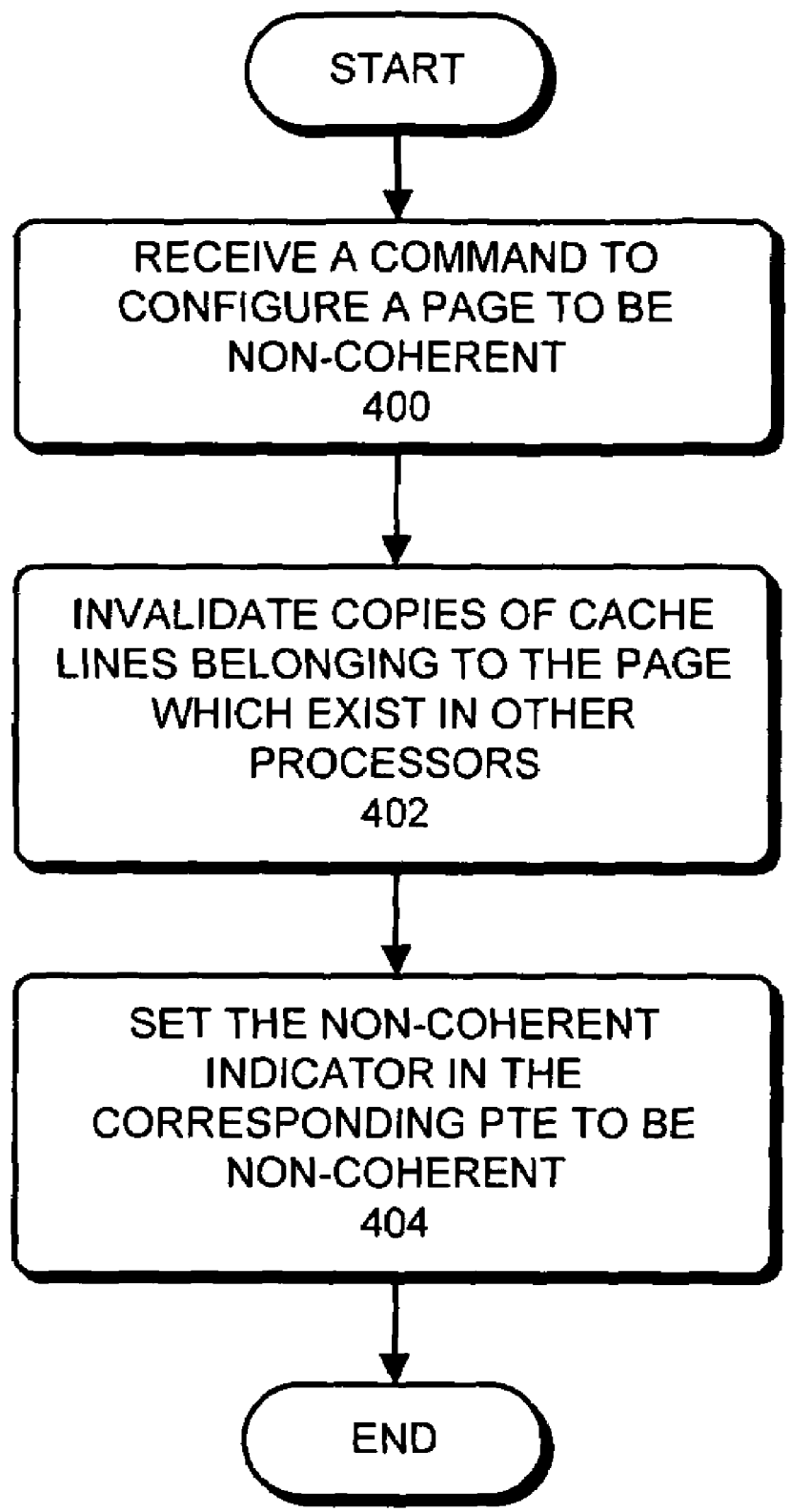
FIG. 4 presents a flowchart illustrating the process of configuring a page to be non-coherent in accordance with an embodiment of the present invention.

In one embodiment of the present invention, a coherent page can be configured to be a non-coherent page. More specifically, FIG. 4 presents a flowchart illustrating the process of configuring a page to be non-coherent in accordance with an embodiment of the present invention.

During operation, a processor within a multiprocessor system receives a command from operating system (OS) to configure a page to be non-coherent (step 400).

Next, if necessary, the system invalidates all cached copies of cache lines from the page which exist in other processors in the multiprocessor system (step 402). Specifically, this invalidation process may be accomplished by issuing an explicit instruction that performs an invalidation cross-call (interrupt) to the other processors in the multiprocessor system. Alternatively, hardware within the multiprocessor system can automatically transmit an invalidation message to the other processors.

Referring back to FIG. 1, if processor 102 desires to configure a line in cache 108 to be non-coherent, processor 102 needs to initiate a transaction to invalidate cached copies of cache lines from the same page which are accessible by processors 104 and 106.

Once all the associated cache lines have been invalidated, the non-coherent indicator in the associated PTE is set to indicate that the page is non-coherent (step 404).

Note that a non-coherent page may be reconfigured to be coherent by simply setting the indicator in the PTE associated with the page to indicate that the page is coherent. A subsequent coherent page access can occur only after the associated PTE has been updated.

Configuring a page to be non-coherent can be beneficial for pages which belong to a thread-local heap (TLH) in a Java Virtual Machine (JVM), wherein objects in the TLH are inaccessible to other threads in the system. As long as the system maintains the binding of the local thread to a specific processor, pages in the TLH may be mapped non-coherently. New objects may be allocated in the TLH based on a compiler-generated proof that these new objects will not become accessible to other threads ("escape analysis"), or in the presence of a mechanism for making them accessible should they eventually become shared ("escape detection").

Furthermore, configuring a page to be non-coherent can be beneficial for pages in a local memory which is exclusively associated with a specific processor in a multiprocessor system, wherein the local memory is not accessible by the other processors. For example, pages in local memories 134, 136, and 138 in FIG. 1 can be configured to be non-coherent. Configuring such pages to be non-coherent can effectively reduce coherence traffic.

Note that, placing the non-coherent indicator in the PTEs has the advantage that the allocations of locally and globally accessible memory are flexible and may be changed dynamically.

Accessing Pages Associated with Non-Coherent Indicators

Figure 5:
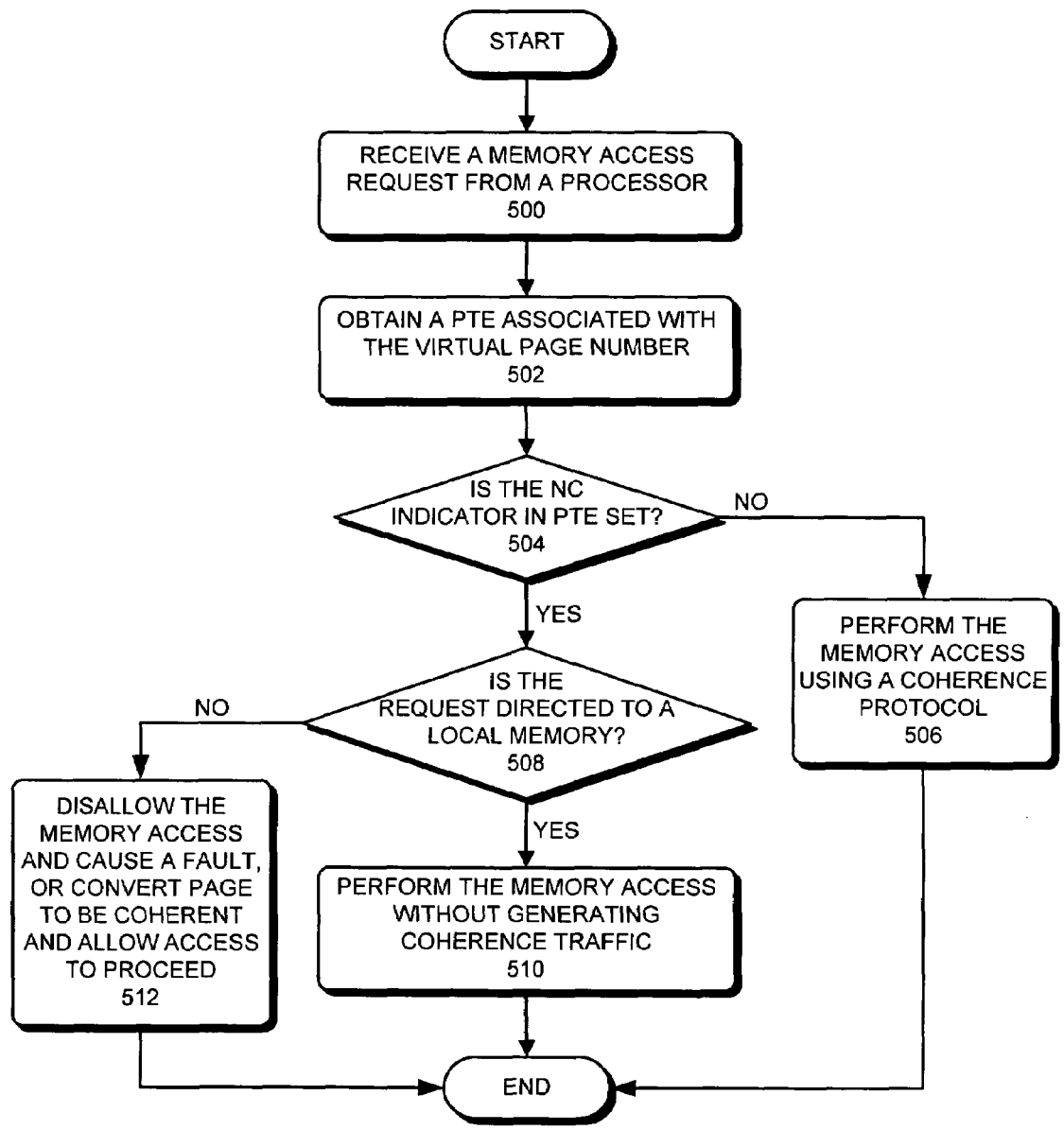
FIG. 5 presents a flowchart illustrating the process of performing a memory access, which can be either coherent or non-coherent in accordance with an embodiment of the present invention.

FIG. 5 presents a flowchart illustrating the process of performing a memory access, which can be either coherent or non-coherent in accordance with an embodiment of the present invention.

During operation, the system first receives a memory access request from a processor (step 500). Specifically, the request includes a virtual address that contains a virtual page number.

Next, the system obtains a PTE associated with the virtual page number (step 502). This is accomplished by looking up the PTE associated with the virtual page number in a TLB which is attached to the processor. If the TLB lookup generates a hit, the system obtains the PTE from the TLB, whereas if the TLB lookup generates a miss, the system attempts to obtain the PTE from a corresponding page table in main memory and loads the PTE into the TLB.

Once the PTE is obtained, the system determines if the memory access is coherent or non-coherent based on the non-coherent indicator in the PTE (step 504). If the system determines that the memory access is coherent (i.e. NC bit=0), the system performs the memory access using a conventional coherence protocol (step 506).

On the other hand, if the system determines that the memory access is non-coherent (i.e. NC bit=1), the system next determines if the page access request is directed to a local memory or a remote memory (step 508). If the request is directed to a local memory, the system performs the memory access without generating coherence traffic (step 510). Note that during the subsequent non-coherent memory access, a cache miss may occur so that the local processor may need to retrieve the cache line from a next level of cache, or from the local memory. In this case, it is desirable for the non-coherent indicator from the PTE to be carried along with the physical address of the page during the subsequent processing of the memory reference to ensure that the processing of the memory reference does not generate coherence traffic.

If, however, the memory access request is directed to a remote memory (i.e. one processor attempts to gain non-coherent access to a local memory associated with another processor), the system can take one of the following actions (step 512). In one embodiment of the present invention, the system can simply disallow the requested memory access by sending an error message to the processor which issues the request. In another embodiment of the present invention, the system can choose to convert the associated page to be coherent and then allow the memory access to the remote memory to proceed. In yet another embodiment of the present invention, the system may choose to relocate the page into a shared-memory-space in the main memory.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing coherence traffic in a multiprocessor system by supporting both coherent memory accesses and non-coherent memory accesses, the method comprising:

receiving a request to perform a memory access;

obtaining a page table entry (PTE) associated with the memory access;

determining if the memory access is a coherent memory access or a non-coherent memory access by examining an indicator bit in the PTE, wherein during a coherent memory access, memory is accessed using a cache-coherence protocol, which generates coherence traffic, and wherein during a non-coherent memory access, memory is accessed without performing a cache-coherence operation, which does not generate coherence traffic;

if the indicator bit indicates that the memory access is a coherent memory access, performing the memory access using a coherence protocol; and if the indicator bit indicates that the memory access is a non-coherent memory access, performing the memory access without generating coherence traffic, which further involves:
  determining if the request to perform the memory access is directed to a local memory or a remote memory;
  if the request is directed to a local memory, performing the memory access without generating coherence traffic; and
  if the request is directed to a remote memory,
    disallowing the memory access, or
    converting the associated page to be coherent and proceeding with the memory access.

2. The method of claim 1, further comprising:
receiving a command at a processor to configure a page to be non-coherent;
if necessary, invalidating all cached copies of cache lines from the page which exist in other processors in the multiprocessor system; and
setting the indicator in the associated PTE to indicate that the page is non-coherent.

3. The method of claim 2, wherein invalidating all cached copies of the cache lines from the page involves:
issuing an explicit instruction that performs an invalidation cross-call from the processor to the other processors in the multiprocessor system; or
transmitting an invalidation message to the other processors, wherein the invalidation message is generated by hardware in the multiprocessor system.

4. The method of claim 1, wherein obtaining the PTE involves:
looking up the PTE in a translation lookaside buffer (TLB);
if the lookup in the TLB generates a hit, obtaining the PTE from the TLB; and
if the lookup in the TLB generates a miss, obtaining the PTE from a page table in a memory.

5. The method of claim 1, wherein the indicator from the PTE is carried along with a physical address during subsequent processing of the memory access.

6. The method of claim 1, further comprising configuring pages in a thread local heap (TLH) to be non-coherent, wherein the TLH is accessible only by a thread which is local to the processor.

7. The method of claim 1, further comprising configuring pages in a local memory attached to the processor to be non-coherent.

8. The method of claim 1, further comprising:
receiving a command to convert a non-coherent page to be a coherent page; and
setting the indicator in the PTE associated with the page to indicate that the page is coherent.

9. A computer-readable storage medium storing instructions that when executed by a computer cause the computer to reduce coherence traffic in a multiprocessor system by supporting both coherent memory accesses and non-coherent memory accesses, the method comprising:
receiving a request to perform a memory access;
obtaining a page table entry (PTE) associated with the memory access;
determining if the memory access is a coherent memory access or a non-coherent memory access by examining an indicator bit in the PTE, wherein during a coherent memory access, memory is accessed using a cache-coherence protocol, which generates coherence traffic, and wherein during a non-coherent memory access, memory is accessed without performing a cache-coherence operation, which does not generate coherence traffic;
if the indicator bit indicates that the memory access is a coherent memory access, performing the memory access using a coherence protocol; and
if the indicator bit indicates that the memory access is a non-coherent memory access, performing the memory access without generating coherence traffic, which further involves:
  determining if the request to perform the memory access is directed to a local memory or a remote memory;
  if the request is directed to a local memory, performing the memory access without generating coherence traffic; and
  if the request is directed to a remote memory,
    disallowing the memory access, or
    converting the associated page to be coherent and proceeding with the memory access.

10. The computer-readable storage medium of claim 9, further comprising:
receiving a command at a processor to configure a page to be non-coherent;
if necessary, invalidating all cached copies of cache lines from the page which exist in other processors in the multiprocessor system; and
setting the indicator in the associated PTE to indicate that the page is non-coherent.

11. The computer-readable storage medium of claim 10, wherein invalidating all cached copies of the cache lines from the page involves:
issuing an explicit instruction that performs an invalidation cross-call from the processor to the other processors in the multiprocessor system; or
transmitting an invalidation message to the other processors, wherein the invalidation message is generated by hardware in the multiprocessor system.

12. The computer-readable storage medium of claim 9, wherein obtaining the PTE involves:
looking up the PTE in a translation lookaside buffer (TLB);
if the lookup in the TLB generates a hit, obtaining the PTE from the TLB; and
if the lookup in the TLB generates a miss, obtaining the PTE from a page table in a memory.

13. The computer-readable storage medium of claim 9, wherein the indicator from the PTE is carried along with a physical address during subsequent processing of the memory access.

14. The computer-readable storage medium of claim 9, further comprising configuring pages in a thread local heap (TLH) to be non-coherent, wherein the TLH is accessible only by a thread which is local to the processor.

15. The computer-readable storage medium of claim 9, further comprising configuring pages in a local memory attached to the processor to be non-coherent.

16. The computer-readable storage medium of claim 9, further comprising:
receiving a command to convert a non-coherent page to be a coherent page; and
setting the indicator in the PTE associated with the page to indicate that the page is coherent.

17. An apparatus that reduces coherence traffic in a multiprocessor system by supporting both coherent memory accesses and non-coherent memory accesses, the apparatus comprising:
a receiving mechanism configured to receive a request to perform a memory access;
a lookup mechanism configured to look up a page table entry (PTE) associated with the memory access;

an accessing mechanism configured to determine if the memory access is a coherent memory access or a non-coherent memory access by examining an indicator bit in the PTE, wherein during a coherent memory access, memory is accessed using a cache-coherence protocol, which generates coherence traffic, and wherein during a non-coherent memory access, memory is accessed without performing a cache-coherence operation, which does not generate coherence traffic;

wherein if the indicator bit indicates that the memory access is a coherent memory access, the accessing mechanism is configured to perform the memory access using a coherence protocol; and wherein if the indicator bit indicates that the memory access is a non-coherent memory access, the accessing mechanism is configured to perform the memory access without generating coherence traffic, which involves:
- determining if the request to perform the memory access is directed to a local memory or a remote memory;
- if the request is directed to a local memory, performing the memory access without generating coherence traffic; and
- if the request is directed to a remote memory,
  - disallowing the memory access, or
  - converting the associated page to be coherent and proceeding with the memory access.

18. The apparatus of claim 17, further comprising:
a receiving mechanism configured to receive a command at a processor to configure a page to be non-coherent;
a invalidation mechanism configured to invalidate all cached copies of cache lines from the page which exist in other processors in the multiprocessor system; and
a setting mechanism configured to set the indicator in the associated PTE to indicate that the page is non-coherent.

19. A computer system that reduces coherence traffic by supporting both coherent memory accesses and non-coherent memory accesses, comprising:
a plurality of processors;
a set of caches coupled to the plurality of processors;
a shared memory;
an interconnect which couples together the plurality of processors and the shared memory, wherein the interconnect is configured to transport addresses, data and coherence traffic between the shared memory and the plurality of processors;
a receiving mechanism configured to receive a request to perform a memory access;
a lookup mechanism configured to look up a page table entry (PTE) associated with the memory access;
an accessing mechanism configured to determine if the memory access is a coherent memory access or non-coherent memory access by examining an indicator bit in the PTE, wherein during a coherent memory access, memory is accessed using a cache-coherence protocol, which generates coherence traffic, and wherein during a non-coherent memory access, memory is accessed without performing a cache-coherence operation, which does not generate coherence traffic;

wherein if the indicator bit indicates that the memory access is a coherent memory access, the accessing mechanism is configured to perform the memory access using a coherence protocol; and wherein if the indicator bit indicates that the memory access is a non-coherent memory access, the accessing mechanism is configured to perform the memory access without generating the coherence traffic, which involves:
- determining if the request to perform the memory access is directed to a local memory or a remote memory;
- if the request is directed to a local memory, performing the memory access without generating coherence traffic; and
- if the request is directed to a remote memory,
  - disallowing the memory access, or
  - converting the associated page to be coherent and proceeding with the memory access.

* * * * *